(12) United States Patent
Cmich

(10) Patent No.: US 11,397,978 B2
(45) Date of Patent: Jul. 26, 2022

(54) METHOD AND APPARATUS FOR IDENTIFYING DESIRE CONSENSUS THROUGH ANONYMOUS INPUTS

(71) Applicant: Ryan Cmich, Wadsworth, OH (US)

(72) Inventor: Ryan Cmich, Wadsworth, OH (US)

( * ) Notice: Subject to any disclaimer, the term of this patent is extended or adjusted under 35 U.S.C. 154(b) by 0 days.

(21) Appl. No.: 16/314,829

(22) PCT Filed: Jul. 28, 2018

(86) PCT No.: PCT/US2018/044259
§ 371 (c)(1),
(2) Date: Jan. 2, 2019

(87) PCT Pub. No.: WO2019/125518
PCT Pub. Date: Jun. 27, 2019

(65) Prior Publication Data
US 2021/0208670 A1    Jul. 8, 2021

Related U.S. Application Data

(60) Provisional application No. 62/609,890, filed on Dec. 22, 2017.

(51) Int. Cl.
*G06Q 30/00* (2012.01)
*G06Q 30/06* (2012.01)

(52) U.S. Cl.
CPC .................. *G06Q 30/0633* (2013.01)

(58) Field of Classification Search
CPC ............ G06Q 30/0633; G06Q 30/0631; H04L 51/046
See application file for complete search history.

(56) References Cited

U.S. PATENT DOCUMENTS

2007/0040546 A1* 2/2007 Courtel .................... H03K 5/24
324/76.24
2010/0262932 A1* 10/2010 Pan ........................ H04L 67/22
715/780

(Continued)

OTHER PUBLICATIONS

Compatibility of Mating Preferences, by Haluk O. Bingol and Omer Basar, Bogazici University, Istanbul, Turkey arXiv:1604.04783v2 [cs.CY] Jul. 26, 2016 (Year: 2016).*

(Continued)

*Primary Examiner* — Sun M Li

(57) ABSTRACT

Current solutions do not provide for the recognition of anonymous consensus around a desire, particularly in the case of already acquainted individuals. This invention is a method, device, system and online platform which allows two or more people to know when they are in agreement of a particular desire without revealing either participants desire unless there is consensus across the participants. A means is provided for which participants may simply express their desire for engaging in an activity with pre-established partner(s) using a means which is undetectable to the other party(s) unless all participants also share the same desire. At the point where consensus is reached, the invention will inform appropriate participants of their shared desire. Additionally, the invention provides for a means to use this desire data to influence participants in an effort to increase the likelihood of reaching anonymous consensus.

20 Claims, 5 Drawing Sheets

(56) References Cited

U.S. PATENT DOCUMENTS

| | | | | |
|---|---|---|---|---|
| 2013/0110731 A1* | 5/2013 | Wey | ....................... | G06Q 10/06 |
| | | | | 705/319 |
| 2013/0205220 A1* | 8/2013 | Yerli | .................... | G06F 3/0482 |
| | | | | 715/748 |
| 2015/0100637 A1* | 4/2015 | Lakshmegowda | ........................... | |
| | | | | H04L 67/1044 |
| | | | | 709/204 |
| 2015/0153443 A1* | 6/2015 | Van Taunay | .......... | G01S 1/0428 |
| | | | | 702/150 |
| 2016/0236542 A1* | 8/2016 | Stiehler | ................... | A61L 9/125 |
| 2016/0253710 A1* | 9/2016 | Publicover | .......... | G06F 16/2358 |
| | | | | 705/14.66 |
| 2017/0024699 A1* | 1/2017 | Millership | ............. | G06Q 50/01 |

OTHER PUBLICATIONS

A. P. Lenton, B. Fasolo and P. M. Todd, ""Shopping" for a Mate: Expected versus Experienced Preferences in Online Mate Choice," in IEEE Transactions on Professional Communication, vol. 51, No. 2, pp. 169-182, Jun. 2008, doi: 10.1109/TPC.2008.2000342. (Year: 2008).*

* cited by examiner

METHOD AND APPARATUS FOR IDENTIFYING DESIRE CONSENSUS THROUGH ANONYMOUS INPUTS

FIELD OF THE INVENTION

The present disclosure generally relates to the field of personal communication. More specifically, the present disclosure relates to methods and systems for identifying desire consensus through anonymous inputs. It shall be understood that the usage of the term "anonymous" throughout the present disclosure signifies that a user's desire is "not identified, lacking recognizability" to other users, that is, the desire remains private. As such, "private," "confidential," or any other synonym thereof may be used in substitute for anonymous throughout this disclosure.

BACKGROUND OF THE INVENTION

During social occasions, some individuals may like to know if other individual(s) have similar desire(s) as their own. Often, individuals may be embarrassed to disclose their desire(s). However, they may disclose their desire(s), if they know others have similar desire(s).

These situations are most commonly associated with personal relationships and/or sexual encounters. For example, an individual "A" may be interested in attending an intimate social event with an individual "B". However, the individual "A" may be uncertain as to whether the individual "B" has the same desire(s) as their own. Typically, the individual "A" has no way of knowing individual "B" 's desire(s) without revealing their own. Further, the individual "A" may be hesitant to do so for a number of possible concerns. The individual "A" may want to avoid a feeling of rejection. Further, if the individual "A" and the individual "B" are currently casual friends, this casual relationship may be harmed once "B" knows of the individual "A" 's more intimate intentions. Therefore, the individual "A" may not act upon their desire and may let the opportunity for advancing their relationship with the individual "B" to pass. These missed opportunities may have a significant impact on both the individual "A" and the individual "B" s quality of life.

In another example, a sexually intimate couple has laid down into bed for an evening. One of the partners (an individual "A") may be interested in a specific sexual activity (desire) but is unsure if their partner (an individual "B") has a similar desire. The individual "A" could ask "B" if they are interested in the specific sexual activity, but they may be hesitant because of a number of concerns. Such as, previous propositions by the individual "A" may have been turned down by the individual "B". So, the individual "A" may want to avoid any additional feelings of rejection. Further, the individual "A" may be concerned with being branded as lecherous. Yet further, the individual "A" may be worried of disturbing the individual "B" who may have already started to fall asleep. Therefore, the individual "A" may not act upon their desire and lets the opportunity for engaging in the specific sexual activity to pass. However, the individual "B" may actually have a similar desire (for the specific sexual activity) as the individual "A", but the individual "B" may not act on their desires for similar reasons as the individual "A". Over time, these missed opportunities may lead to a degradation in the quality of the relationship between the individual "A" and the individual "B". In the practice of psychology and relationship counseling, this problem is often associated with desire discrepancy or desire disparity.

Therefore, some individuals may use a number of verbal and nonverbal actions intended to convey one's desire(s) to a receiving individual(s), with the hope that the actions are interpreted correctly if the receiving individual(s) has similar desire(s). For example, if an individual is interested in a specific sexual activity, then the individual may exhibit slightly more physical/intimate contact with the receiving individual. Further, the verbal cues may involve flirtatious conversations and suggestive innuendos. Yet further, the individual may attempt to "set the mood" through modification of the environment with lighting, music, fragrance, etc. Moreover, the individual may dress or adjust their physical appearance in a way intended to suggest their interests. However, such methods may not lead to the desired outcomes. Often there remains ambiguity over the true intentions of the involved individuals. Further, the actions may be overtly obvious to where the acting individual may be left embarrassed and/or rejected when their desires are not shared. Accordingly, some users may mask the identity and/or contact information when communicating through a variety of methods (internet, telephone, etc.) to avoid embarrassment.

Further, some solutions involve identifying partner compatibility through the matching of various attributes within a database. Moreover, some solutions involve anonymously matching user profiles. However, these solutions do not provide for the recognition of anonymous consensus around a desire, particularly in the case of already acquainted individuals.

Therefore, there is a need for improved methods and apparatus for identifying desire consensus through anonymous inputs.

SUMMARY OF THE INVENTION

This summary is provided to introduce a selection of concepts in a simplified form that are further described below in the Detailed Description. This summary is not intended to identify key features or essential features of the claimed subject matter. Nor is this summary intended to be used to limit the claimed subject matter's scope.

According to some embodiments, a method, a device, system and an online platform may be disclosed for identifying desire consensus through anonymous inputs. The disclosed a method, a device, system and online platform allow two or more people to know when they are in agreement of a particular desire without revealing either participants desire unless there is consensus across the participants. Therefore, they provide a means for which participants may simply express their desire for engaging in an activity with pre-established partner(s) using a means which is undetectable to the other party(s) unless all participants also share the same desire. Accordingly, the users will achieve desired outcomes in social situations more frequently than they would have using traditional methods. This will result in a greatly enhanced overall quality of life for those users.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAILED DESCRIPTION OF THE INVENTION

Figure 1:
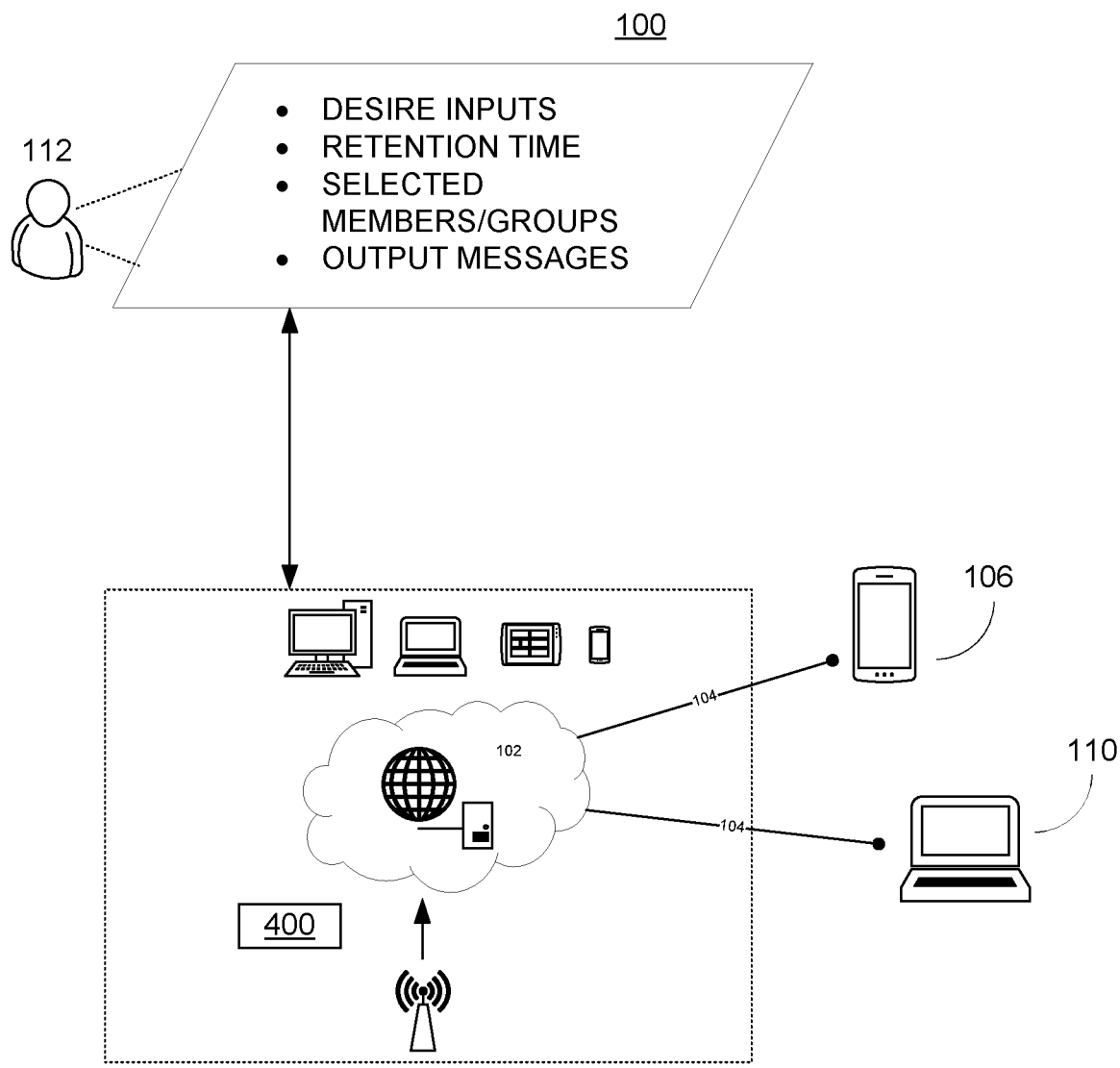
FIG. 1 is an illustration of a platform consistent with various embodiments of the present disclosure.

As a preliminary matter, it will readily be understood by one having ordinary skill in the relevant art that the present disclosure has broad utility and application. As should be understood, any embodiment may incorporate only one or a plurality of the presently-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subject matter disclosed under the header.

The present disclosure includes many aspects and features. Moreover, while many aspects and features relate to, and are described in, the context of identifying desire consensus through anonymous inputs, embodiments of the present disclosure are not limited to use only in this context.

FIG. 1 is an illustration of a platform consistent with various embodiments of the present disclosure. By way of non-limiting example, the online platform 100 for identifying desire consensus through anonymous inputs may be hosted on a centralized server 102, such as, for example, a cloud computing service. The centralized server 102 may communicate with other network entities, such as, for example, a mobile device 106 (such as a smartphone, a smartwatch, a laptop, a tablet computer etc.), other electronic devices 110 (such as desktop computers, server computers etc.), over a communication network 104, such as, but not limited to, the Internet. Further, users of the platform may include relevant parties such as, but not limited to, individuals and administrators etc. Accordingly, in some instances, electronic devices operated by the one or more relevant parties may be in communication with the platform 100. For example, the mobile device 106 may be operated by an individual for providing a desire input anonymously.

A user 112, such as the one or more relevant parties, may access platform 100 through a web based software application or browser. The web based software application may be embodied as, for example, but not be limited to, a website, a web application, a desktop application, and a mobile application compatible with a computing device 400.

Figure 2:
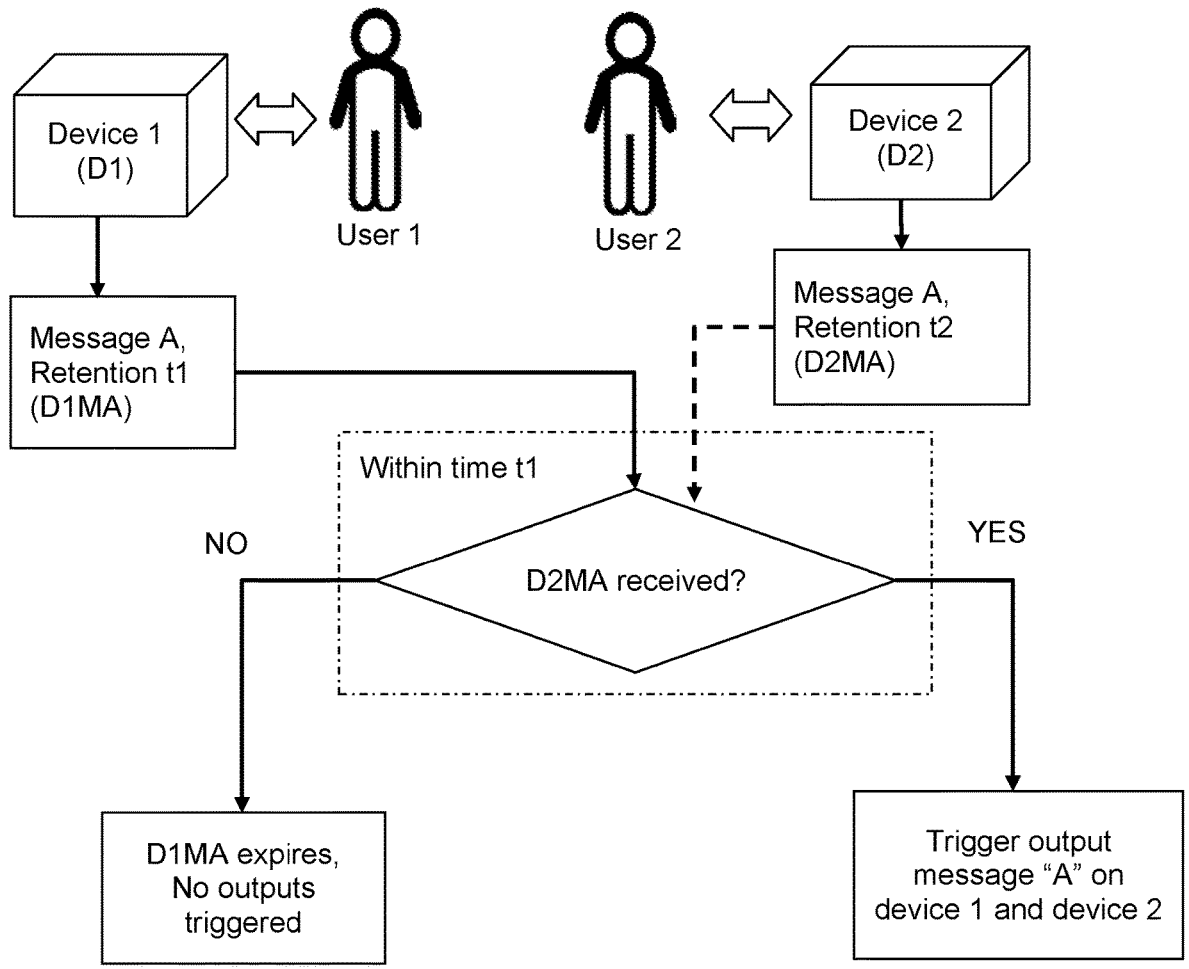
FIG. 2 is a flow diagram illustrating a method for identifying desire consensus through anonymous inputs received from two or more devices corresponding to two or more users, in accordance with some embodiments.

FIG. 2 is a flow diagram illustrating a method for identifying desire consensus through anonymous inputs received from two or more devices (such as Device D1 and Device D2) corresponding to two or more users, in accordance with some embodiments. The two or more devices may form a device group. The devices may be accessible to individual users of a user group. Further, the devices may be able to communicate directly or indirectly with all other devices within the group. The two or more devices may be specialized devices designed for providing anonymous desire inputs and receiving output messages. Alternatively, the two or more devices may be an existing product such as a computer, smartphone, smartwatch, glasses, neural implants, or other with which a software application may be installed allowing utilization of the product's existing input and output functions. Accordingly, power is required by the two or more devices to support the electrical processes necessary for receiving inputs, communicating with other devices, and generating outputs. This power may be supplied by one or more of a battery located in the device, an AC power supply wired to a device, some combination of battery and AC power supply, a wired connection to another powered device and a user's bio-electricity.

A desire input is received from one of the group members into the device D1 within their possession. These inputs may be performed through one or more of pressing a physical button or electrical connector, activating a capacitive or resistive touch sensor, triggering a motion sensitive sensor such as a gyroscope or accelerometer, using magnetic/hall effect sensor and/or optical sensor, providing audio input (ex. microphone) and providing a bio-electrical input.

Further, biometrics sensors may be used to sense one or more physiological parameters such as pulse, pheromones, etc. The physiological parameters may be analyzed to detect desire(s) (such as arousal). Further, the detected desire(s) may then be used to trigger desire input directly or to verify an actual input, or to adjust an output message.

A desire input may be of the form of one or more of a simple binary input with universal understanding amongst the user group, an image with universal understanding amongst the user group, a full textual message in a language common to users of the group and an audio message with universal understanding amongst the users of the device group.

The desire input received from the device D1 may be shared across the other connected devices (such as the device D2) or the desire input may be stored within one of the devices of the group or the desire input may be sent to and stored within a central server (such as the server 102). In either case, a retention time period for the desire input is assigned. This retention time period may be set uniquely by the user providing the desire input or as a standard for the device group. Further, the retention time period may range from a finite duration to indefinite. The retention time period may be specified by setting it directly on devices that support this type of input, or by simply pressing a single input button associated with device D1 multiple times. Moreover, retraction of an input message from the originating user may be possible, for example by pressing and holding a button associated with device D1 for a set period of time, or by pressing a second button (that may be labeled as 'Cancel') associated with device D1.

If during this retention time period, a matching desire input is also sent from any or all of the other connected devices (such as the device D2), then those devices which sent a matching desire input from their user will trigger an output message to the respective users. If during this time period, a matching desire input is not received then the desire input expires, and no output message is triggered. The output message will notify the respective users that their desire was shared by other(s) within the device group. The output message may be of the form of one or more of a visual spectrum lighting ranging from a simple single lighted element to a message or an image on a graphic display, a physical output such as a haptic feedback, an audible output from a resonating device or an electrical stimulus to a user's nervous system. Further, the output message may also be presented through a number of connected devices. For example, one or more lights may be dimmed, music may be turned on, etc. Further, smart home protocols such as IFTTT (if this, then that) may be used to execute these actions through the connected devices. Output messages may also be delayed by a randomized increment of time to make it more difficult to guess which user was the last to activate his or her input device.

In order to properly match desire inputs with the intended users, the corresponding devices may be identifiable to other users within the group. Therefore, on the devices with sufficient means (such as a smartphone), a user may possess a profile that uniquely identifies them within the group. For example, a profile may contain personal information such as name or photo or home address or phone number or email, etc. . . . it may also include biometric information which may be used to identify and authenticate users. Further, one or more of a pin code, a unique sequence etc. may be used to identify and authenticate users. These profiles may be searched by other users within the group. The profiles may exist for the sole purpose of the invention herein, or may be part of an existing social network group. However, in the case of devices not possessing a means for identifying the user, it is intended that each of such devices are to be within the possession of one member of a group of acquainted individuals who are aware of the other devices in the group. Device groups may be established through physically connecting devices, or wirelessly pairing with each other, or simply by being within close proximity of each other. Alternatively, biometric authentication may be used.

Figure 3:
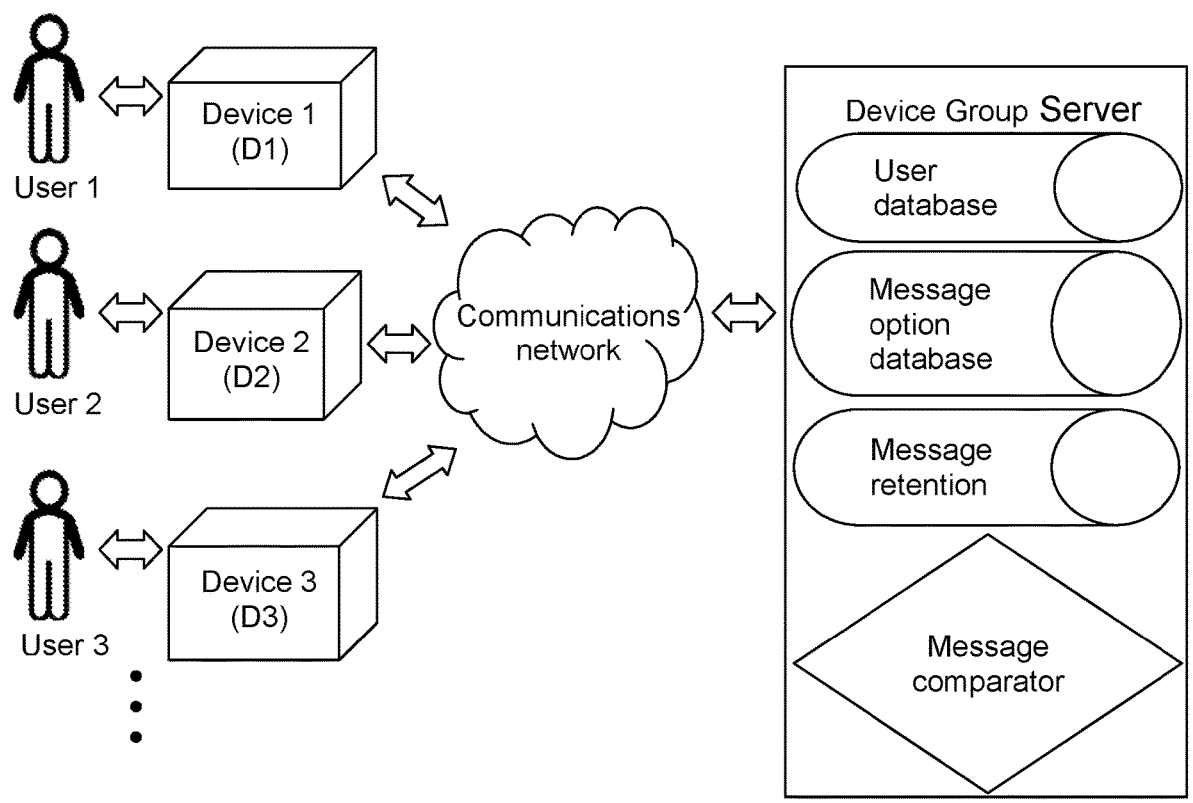
FIG. 3 is a block diagram illustrating communication between two or more devices and a device group server, in accordance with some embodiments.

FIG. 3 is a block diagram illustrating communication between two or more devices (such as Device D1, Device D2, Device D3 and so on) and a device group server, in accordance with some embodiments.

Inter-device communication may be required in order to match desire inputs received from multiple devices and send output notifications to the matched devices. The communication between devices may be performed using one or more of wires that pass between all or a sub-set of connected devices, wireless signals that travel directly between devices, wireless signals that travel first to a communication network or other intermediate means (such as the device group server) and then wirelessly back to the other devices of a group or any combination of wired and wireless methods.

The device group server may include a user database (for storing user profiles), a message option database (for storing a common list of desires), a message retention component (to retain messages for the set retention time period) and a message comparator (to match desire inputs). The message option database helps in ensuring the identification of consensus by avoiding situations where users use different wording or phrase to identify the desires. Alternatively, artificial intelligence may be applied to recognize that desires that are input differently actually mean the same.

The desire input messages from any of the devices within the group may be directed to all other devices of the group. Thereafter, the matching desire inputs from any of the other devices in the group will trigger an output message to those devices with matching inputs.

The desire input messages from any of the devices within the group may be directed to selected members/devices of the group. Accordingly, when creating a desire input, a user may select member(s) for which the desire applies. Only matching desire inputs from these members will result in a confirmation output message to those same members.

While desire inputs may be indicative of interest in sexual activities, this is not intended to limit the scope of the invention, as this may also be applied to other activities, for example shopping. In an embodiment directed towards shopping, one user may add an item to a shopping cart (online, electronic, or otherwise), beginning the retention period timeout count-down. If a second user then adds the same item (or alternately an item that is in the same category of goods) to his or her shopping cart, then an output message is triggered to the devices of both users to indicate that a consensus has been reached.

As used in this disclosure, the phrase "desire consensus through anonymous inputs" may refer to a desire from a user to let another person know something, but only if the other person is also thinking the same. For example, person "A" has the desire to let person "B" know that they are "thinking of you", but only if person "B" is also thinking of person "A". In this example, "A" and "B" would then receive notifications that they are thinking of each other (without being first prompted by the other person).

In some embodiments, instead of requiring an input from both users to identify consensus of a desire, one or multiple users may pre-set a schedule for when they are open for an activity. For example, a user A may set Friday nights from 20:00 to 23:00 as a time period when the user A is always interested in sex. If user B inputs the same desire during that time the outputs are triggered. Alternatively, if multiple users enter time slots that overlap, then an output will be automatically triggered at the first intersection time of the different schedules. For example, the schedules may be set weekly, monthly, or by some other pre-determined sequence.

A user who pre-sets a schedule of when they know they are not going to be interested in a particular desire may choose if this schedule is made public to other users. This may be done a number of ways including, but not limited to 1) via a schedule managing interface that can be viewed by other users at any time 2) with immediate output feedback to a user upon their input of a desire.

In some embodiments, a device may be either pre-programmed with, or may sense directly (in the case of a wearable device) the user's menstrual cycle. This information may be used directly and/or combined with the user inputs to adapt the output response. For example, a consensus of desires is recognized and aligned with a fertile time in the female partner's menstrual cycle. This will trigger a unique output that informs the participants of consensus, but also of the risk (or opportunity) of pregnancy if protection is not used. Further, the female partner's device may continuously communicate an output indicating the status of the user's menstrual cycle (for example with a glowing LED of particular color).

In some embodiments, in addition to identifying consensus of a common desire, features may be added to the devices and/or software application where specific options associated with the desire may be selected by the users. Anonymous consensus may then also be identified for each of these desire options as well. For example, a user A may identify interest in sexual techniques 1, 4, 7. Further, a User B may identify interest in techniques 1, 2, 4. Upon recognition of a common desire, the devices may then provide a recommendation for a particular technique based on the common alignments of the users' technique preferences (in this case 1 or 4).

Additionally, recommendations for activities may include objects from an object database. A user group may build a database of objects which they own that could be used in combination with particular activity desires, the system may reference this database and provide recommendations to users for activities that can be done in combination with various objects. For example, if the database contains a wedge pillow, the system may recommend the pillow in combination with various different sexual positions. The database may be built up through manual entry from users, or automatically as items are purchased by the group through an e-store selling relevant products that is connected with the user's profiles.

In some embodiments, the devices and/or software applications may store information associated with input activations, for example to build a history of the dates and times when a particular user typically indicates desire. This history may be made available to healthcare professionals or other parties for purposes such as finding days or times when multiple users typically indicate desire near the same time but do not match exactly. The history may be sent to healthcare professionals or other parties by using the networking and processing capabilities built into the device or system, or by adding a separate device to the device group specifically for this purpose. The device or system itself may also analyze the stored history and send timing suggestions to one or more output devices.

In some embodiments, a device may be enhanced with additional capabilities that are activated when a user indicates desire. For example, a fragrance or pheromone cartridge (similar to those currently known and available) may be attached and configured to release fragrance or pheromones into the air when a user indicates desire by activating the device's button or other input mechanism.

In an embodiment when a user presses a button multiple times to increase the timeout duration for their desire, the light ring on same device will progressively light more of the arc of the ring upon each press. For example, after one press ⅓th of the ring lights representing the minimum duration (ex. 15 min), after a second press ⅔ths of the ring lights representing next level duration (ex. 60 min), this progresses until the ring is fully lit indicating the maximum desire duration (ex 24 hrs). If there is desire duration time remaining when the button is pressed then the duration is increased to the next level up from the current remaining time, and the respective portion of the ring is lit.

Users can build an anonymous profile of their desires by answering a series of specially designed questions. The invention can then analyze two or more profiles and create a report for all users showing where their desires are in alignment. In the example of sexual interests, areas of desire that questions may be designed for and consensus noted in report include (but are not limited to): positions, types of, use of toys, games, times, places, etc . . . , additional people, etc. . . . . Additionally, a "desire discrepancy rating" may be provided to give an overall sense of how closely aligned the users are. Using information about users' preferences, the system may provide specific recommendations of activities and/or activity plus object(s) to the users when consensus on a general desire is reached.

Figure 4:
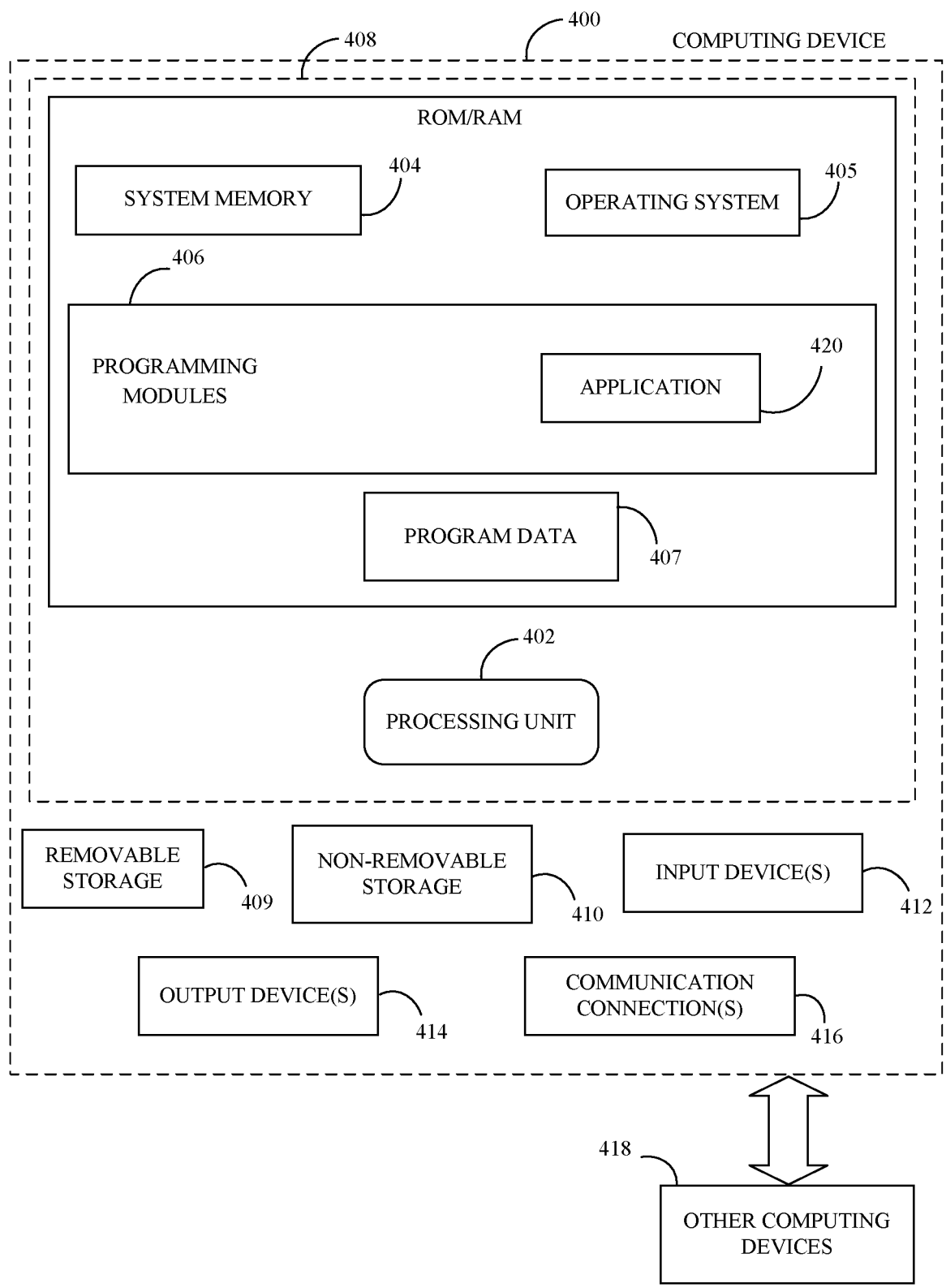
FIG. 4 is a block diagram of a computing device for implementing the methods disclosed herein, in accordance with some embodiments.

With reference to FIG. 4, a system consistent with an embodiment of the disclosure may include a computing device or cloud service, such as computing device 400. In a basic configuration, computing device 400 may include at least one processing unit 402 and a system memory 404. Depending on the configuration and type of computing device, system memory 404 may comprise, but is not limited to, volatile (e.g. random-access memory (RAM)), non-volatile (e.g. read-only memory (ROM)), flash memory, or any combination. System memory 404 may include operating system 405, one or more programming modules 406, and may include a program data 407. Operating system 405, for example, may be suitable for controlling computing device 400's operation. In one embodiment, programming modules 406 may include an image encoding module, machine learning module and/or image classifying module. Furthermore, embodiments of the disclosure may be practiced in conjunction with a graphics library, other operating systems, or any other application program and is not limited to any particular application or system. This basic configuration is illustrated in FIG. 4 by those components within a dashed line 408.

Computing device 400 may have additional features or functionality. For example, computing device 400 may also include additional data storage devices (removable and/or non-removable) such as, for example, magnetic disks, optical disks, or tape. Such additional storage is illustrated in FIG. 4 by a removable storage 409 and a non-removable storage 410. Computer storage media may include volatile and nonvolatile, removable and non-removable media implemented in any method or technology for storage of information, such as computer-readable instructions, data structures, program modules, or other data. System memory 404, removable storage 409, and non-removable storage 410 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information, and which can be accessed by computing device 400. Any such computer storage media may be part of device 400. Computing device 400 may also have input device(s) 412 such as a keyboard, a mouse, a pen, a sound input device, a touch input device, a location sensor, a camera, a biometric sensor, etc. Output device(s) 414 such as a display, speakers, a printer, etc. may also be included. The aforementioned devices are examples and others may be used.

Computing device 400 may also contain a communication connection 416 that may allow device 400 to communicate with other computing devices 418, such as over a network in a distributed computing environment, for example, an intranet or the Internet. Communication connection 416 is one example of communication media.

Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 404, including operating system 405. While executing on processing unit 402, programming modules 406 (e.g., application 420 such as a media player) may perform processes including, for example, one or more stages of methods, algorithms, systems, applications, servers, databases as described above. The aforementioned process is an example, and processing unit 402 may perform other processes. Other programming modules that may be used in accordance with embodiments of the present disclosure may include sound encoding/decoding applications, machine learning application, acoustic classifiers etc.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

Figure 5:
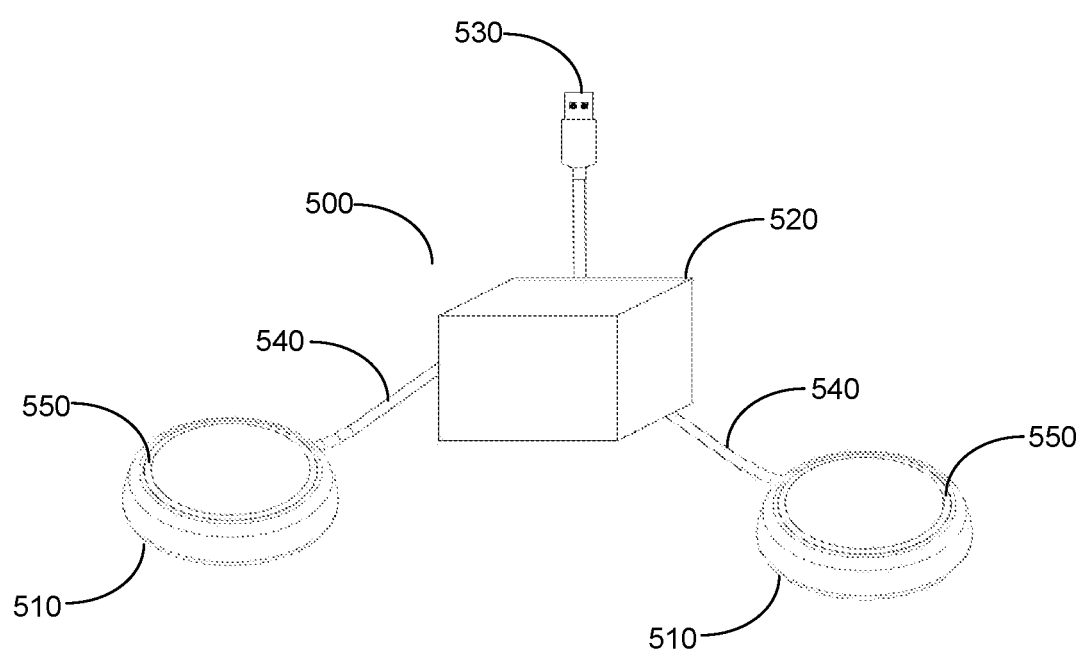
FIG. 5 is an illustration of an example embodiment as a single device.

With reference to FIG. 5, an embodiment of the present disclosure may be implemented as a single device 500. Device 500 includes two or more buttons 510, a computing unit 520, optional power cord 530, and optional connection cords 540. Buttons 510 are capacitive-sensing touch buttons that are activated when an object (such as a finger) loads the sensor or increases the parasitic capacitance to ground. Buttons 510 also contain an output or display mechanism such as LED light ring 550. Computing unit 520 is similar to computing device 400 described above. Computing unit 520 may be physically contained outside of buttons 510 (as illustrated in FIG. 5) or contained within one or more of the buttons 510. Optional power cord 530 is a USB-type connection cord capable of delivering sufficient power to enable operation of computing unit 520 and buttons 510. Power cord 530 is optional in some embodiments, as power may be delivered by a battery or other means. Optional power cord 530 may also enable the device 500 to connect to a PC or other compatible device in order to receive firmware or other updates. Optional connection cords 540 are standard cords connecting buttons 510 with computing unit 520. Optional connection cords 540 deliver power sufficient to operate buttons 510. Optional connection cords 540 also carry signals between buttons 510 and computing unit 520, such as indications that one or more buttons have been activated, or instructions to activate the output or display mechanism of buttons 510. Connection cords 540 are optional because some embodiments may employ other means, such as batteries in conjunction with wireless communications. LED light ring 550 is a collection of standard LED (light-emitting diode) lights arranged in a circular or ring shape. LED light ring 550 may be powered by power cord 530 or by separate batteries. LED light ring 550 is controlled by computing unit 520 and may be turned on and off by commands from computing unit 520. LED light ring 550 is typically configured to turn off after a specific amount of time after it is activated, which can range from a few seconds to several minutes.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

What is claimed is:

1. A system for identifying desire consensus comprising:
a first input device;
a second input device;
a first output device;
a second output device;
one or more processors;
where one or more desire options are selectable by a first user using the first input device and by a second user on the second input device, each of the one or more desire options being stored on a corresponding memory device;
each of the one or more desire options corresponding to a desire, which is defined as an activity or action that a first user or a second user wants to participate in with the other of the first user and the second user;
where a time period during which the first user or second user is willing to match the desire option with the other of the first user and the second user is associated with a desire selection and is selectable by the first user and stored on a corresponding memory device;
where one processor of the one or more processors is configured to receive a first desire selection signal from the first input device, the first desire selection signal being an electronic input signal corresponding to a first user desire selection made by the first user from the one or more desire options using the first input device;
where any of the one or more processors is configured to begin a timeout count-down upon receiving the first desire selection signal, the timeout count-down corresponding to the time period associated with the first user desire selection;
where any of the one or more processors is configured to receive a second desire selection signal from the second input device, the second desire selection signal being an electronic input signal corresponding to a second user desire selection made by the second user from the one or more desire options;
where a particular processor of the one or more processors is configured to compare the first and second user desire selections corresponding to the respective first and second desire selection signals and determine when the first and second user desire selections are substantially the same and indicative of a matching desire;

where the particular processor is configured to send a desire match signal directly or indirectly to each of the first output device and to the second output device if the first and second user desire selections are determined to be substantially the same before the processor has elapsed the timeout countdown;

where the first and second output devices are each configured to provide a notification to the corresponding first user and second user indicating the matching desire upon receiving the desire match signal;

where the particular processor is configured to refrain from sending any desire match signal to each of the first output device and the second output device if the first and second user desire selections are not determined to be substantially the same before the processor has elapsed the timeout count-down; and where the second output device is configured to refrain from providing a notification to the second user unless receiving the desire match signal.

2. The system for identifying desire consensus of claim 1, where the time period associated with a desire selection may be selected by the first user or the second user, using the respective first input device or second input device.

3. The system for identifying desire consensus of claim 1, where the desire match signal sent from the particular processor to the respective first and second output devices is sent after a specified delay after the particular processor determines the first and second user desire selections are substantially the same.

4. The system for identifying desire consensus of claim 1, where the respective any one of the one or more processors is additionally configured to elapse the timeout count-down if a cancel input signal is received from the first input device before a second desire selection signal is received from the second input device.

5. The system for identifying desire consensus of claim 1, where the first input device and the second input device are each configured to deliver an alternate input signal to the respective processor of the one or more processors; and
where the processor is configured to send an alternate output signal to the second output device when an alternate input signal is received from the first input device.

6. The system for identifying desire consensus of claim 5, further comprising:
a fragrance storage device and release mechanism configured to release a fragrance from the fragrance storage device upon receipt of the alternate input signal;
where the first input device is configured to send the alternate input signal to the respective processor of the one or more processors;
and where the particular processor is configured to send a fragrance release signal to release the fragrance release mechanism when the alternate input signal is received from the first input device.

7. The system for identifying desire consensus of claim 1, further comprising:
a memory unit;
where the memory unit is configured to store a history of first and second desire selections from first and second input devices.

8. The system for identifying desire consensus of claim 7, further comprising:
a sharing device;
where the sharing device is configured to receive a user or device input signal from a user, and the sharing device sends the stored history to the indicated user or device.

9. The system for identifying desire consensus of claim 7, where any of the one or more processors is configured to send desire selection suggestions signals based on the stored history to the first or second output device.

10. The system for identifying desire consensus of claim 1, where the one or more desire options are presented in the form of items for purchase in an e-store, and where the first desire selection signal is sent from the first input device when a first user selects an e-store item that the first user desires to use with the second user,
where the second desire selection signal is sent from the second input device when a second user selects an e-store item that the second user desires to use with the first user.

11. The system for identifying desire consensus of claim 10, where any of the one or more processors is configured to interpret the desire selection signals received from the input devices as a user desire to use an e-store item within a category of goods that includes the selected item.

12. The system for identifying desire consensus of claim 1, further comprising:
a first scheduling device;
where the first scheduling device is configured to allow a first user to input one or more future time periods to be associated with a desire selection; and
where the processor is configured to send a desire match signal to each of the first output device and the second output device if a matching desire is determined when the current time is substantially the same as any one of the one or more future time periods.

13. The system for identifying desire consensus of claim 1, further comprising:
a profile entry device;
where the profile entry device is configured to allow a user to enter user profile data; and
where the profile entry device is configured to send user profile data to a particular processor.

14. The system for identifying desire consensus of claim 13, where the particular processor is additionally configured to provide desire selection input recommendations based on received profile data by sending alternate output signals to the first and second output devices.

15. A method for identifying desire consensus comprising:
beginning a timeout count-down, using a processing device, when a first desire selection signal from a first input device is received by the processing device, the first desire selection signal corresponding to a first user's desire selected from one or more desire options available to the first user and to a second user, a desire being defined as an activity or action that a first and/or second user wants to participate in with the other of the first and second user, the each of the first desire selection signal and a second desire selection signal being an electrical input signal, the timeout count-down continuing for a time period associated with the first user desire selection and during which the first user is willing to match the desire option with the other of the first user and the second user, sending a desire match output signal, using a processing device, to a first output device and a second output device when a second desire selection signal is received by the processing device from a second input device and determined by the processing device as being substantially the same as the first user desire selection before the processing device has elapsed the timeout count-down;

where each of the first and second output devices send a notification to one of the respective first user and second user of the matching desire upon receiving the desire match signal;

where the processing device refrains from sending any desire match signal to each of the first output device and the second output device when the first and second user desire selections are not determined as being substantially the same before the processing device has elapsed the timeout count-down; and where the second output device refrains from providing a notification to the second user unless receiving the desire match signal.

16. The method for identifying desire consensus of claim 15, where the processing device elapses the timeout count-down when a desire cancel signal is received from the first input device.

17. A device for identifying desire consensus comprising:
a first input button;
a second input button;
a first output display;
a second output display;
one or more processors;
where a processor is configured to receive an electronic desire selection signal and begin a timeout count-down when the first input button is activated,
where activating the input button indicates a user's desire to participate in an action or activity with a second user within a specified time period;
where the processor is configured to send a desire match signal to the first output display and to the second output display if a second electronic desire selection signal is received from the second input button and determined by the processor as being substantially the same as the first user's desire selection before the timeout count-down associated with the first button has been elapsed by the processor;

where the first and second output displays notify a first user and a second user of their matching desires upon receiving the desire match signal;

where no desire match output signal is sent to the first output display or second output display if desire selections are not determined by the processor as being substantially the same before the processor has elapsed the timeout count-down; and where the second output display is configured to refrain from providing a notification to the second user unless receiving the desire match signal.

18. The device for identifying desire consensus of claim 17, where the duration of the desire time period may be selected by triggering the first input button multiple times.

19. The device for identifying desire consensus of claim 17, where the processor is configured to not send a desire match confirmation output signal to the first output display or to the second output display if a desire cancel signal is received from the first input button before a second desire selection signal from the second input button is determined by the processor as being substantially the same as the first user's desire selection.

20. The device for identifying desire consensus of claim 17, where the first input button and the second input button are activated without audible sound from a mechanical button.

* * * * *